United States Patent
Olufemi-Jones

(10) Patent No.: US 10,518,670 B1
(45) Date of Patent: Dec. 31, 2019

(54) VEHICLE SEAT MANUVERABLE IN MULTIPLE CONFIGURATIONS FOR EASY ENTRY IN AND EXIT FROM A VEHICLE

(71) Applicant: Rehema Olufemi-Jones, De Soto, TX (US)

(72) Inventor: Rehema Olufemi-Jones, De Soto, TX (US)

(*) Notice: Subject to any disclaimer, the term of this patent is extended or adjusted under 35 U.S.C. 154(b) by 47 days.

(21) Appl. No.: 15/976,005

(22) Filed: May 10, 2018

(51) Int. Cl.
| | | |
|---|---|---|
| *B60N 2/02* | (2006.01) | |
| *A47C 1/00* | (2006.01) | |
| *B60N 2/24* | (2006.01) | |
| *B60N 2/14* | (2006.01) | |
| *B60N 2/75* | (2018.01) | |
| *B60N 2/07* | (2006.01) | |
| *B60N 2/90* | (2018.01) | |
| *B60N 2/12* | (2006.01) | |

(52) U.S. Cl.
CPC ............ *B60N 2/245* (2013.01); *B60N 2/07* (2013.01); *B60N 2/12* (2013.01); *B60N 2/14* (2013.01); *B60N 2/753* (2018.02); *B60N 2/995* (2018.02)

(58) Field of Classification Search
CPC .......... B60N 2/14; B60N 2/245; B60N 2/062
See application file for complete search history.

(56) References Cited

U.S. PATENT DOCUMENTS

| | | | | |
|---|---|---|---|---|
| 4,846,529 A | * | 7/1989 | Tulley | B60N 2/0232 297/344.23 |
| 5,482,354 A | * | 1/1996 | Gryp | A47C 3/18 297/344.22 |
| 5,524,952 A | * | 6/1996 | Czech | B60N 2/14 296/65.12 |
| 6,981,746 B2 | * | 1/2006 | Chung | A47C 3/18 248/425 |
| 7,334,829 B2 | * | 2/2008 | Fukui | B60N 2/0228 296/65.11 |
| 7,399,035 B2 | * | 7/2008 | Kusanagi | B60N 2/245 296/65.07 |
| 8,827,367 B2 | * | 9/2014 | Hibi | B60N 2/0232 297/344.24 |
| 10,099,579 B2 | * | 10/2018 | Kates | B60N 2/245 |
| 2006/0061177 A1 | * | 3/2006 | Billger | A47C 3/18 297/344.21 |
| 2016/0159255 A1 | * | 6/2016 | Kates | B60N 2/245 296/65.18 |

* cited by examiner

*Primary Examiner* — Shin H Kim

(57) ABSTRACT

The present invention is a vehicle seat for use in a vehicle like car or van that is maneuverable in multiple configurations. Vehicle seat is maneuvered by swiveling by a swivel mechanism, sliding by a sliding mechanism and tilting by a tilting mechanism. Swivel mechanism swivels vehicle seat from a first position to a second position. Sliding mechanism slides vehicle seat from the second position to a third position. Tilting mechanism tilts vehicle seat from the third position to a fourth position and thus facilitates a user (dependant or disabled) to sit from a standing position or stand from a sitting position without experiencing much physical pain and without being dependent on a caregiver. Once the user completely sits in the vehicle seat or stands from vehicle seat, the vehicle seat is then retracted till the first position is achieved.

7 Claims, 5 Drawing Sheets

US 10,518,670 B1

VEHICLE SEAT MANUVERABLE IN MULTIPLE CONFIGURATIONS FOR EASY ENTRY IN AND EXIT FROM A VEHICLE

BACKGROUND OF THE INVENTION

1. Field of the Invention

The present disclosure relates to a seat of a vehicle. More particularly, the present disclosure relates to a vehicle seat that is maneuverable in multiple configurations for rendering easy entry and exit of dependents or disabled persons from a vehicle with less assistance from a caregiver and with reduced physical pain.

2. Description of the Related Art

A dependent or disabled person who is challenged with ambulatory movements or an individual who is suffering from severe backache faces difficulty and experiences pain while twisting the body for sitting in or coining out of a conventional seat of a vehicle, which is fixedly positioned in the vehicle, and require assistance from a caregiver. Hence, there is a need for a maneuverable vehicle seat.

Several designs of various vehicle seats have been designed in the past. None of them, however, include a vehicle seat for a dependent/disabled user that is maneuvered in multiple configurations for facilitating ease entry in and exit out of a vehicle.

Applicant believes that a related reference corresponds to U.S. Pat. No. 6,981,746 filed by Pro-Glory Enterprise Co. Ltd. for a rotating car seat mechanism. The Pro-Glory reference discloses a swivel seat for a vehicle that provides a fixed seating platform surrounding a swivel seating platform and a smooth transition from the edge of the vehicle seat to the seating platform. However, the rotating car seat mechanism disclosed by Pro-Glory provides only rotating/swiveling movement of a seat of a car which is not sufficient to release user's pain and dependency on a caretaker while stepping in and out through a car door.

Another related application is U.S. Pat. No. 5,482,354 filed by Sears Manufacturing Co. for a swivel seat, especially for vehicles. The Sears reference discloses a swivel mechanism for a seat. However, the Sears reference provides only swiveling movement of a seat of a car which is not sufficient to release user's pain and dependency on a caretaker while stepping in and out through a car door.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention is provide a vehicle seat maneuverable in multiple configurations including swiveling, sliding and tilting for enabling a dependent or disabled user to entry in and exit out of a vehicle easily.

It is still another object of this invention is to provide a vehicle seat that is maneuvered with stability and operated easily.

It is yet another object of this invention is to provide a maneuverable vehicle seat that is compact and foldable.

It is another object of this invention is to provide a vehicle seat that is maneuverable with a swivel mechanism that swivels the vehicle seat within a vehicle and therefore eliminates the need of twisting user's body while sitting in and moving out of the vehicle.

It is another object of this invention is to provide a vehicle seat that is maneuverable with a sliding mechanism that slides vehicle seat in and out of a vehicle and thus provides ease to a user to move in and move out of a vehicle with less physical movements.

It is another object of this invention is to provide a vehicle seat that is maneuverable with a tilting mechanism that tilts vehicle seat thereby providing ease to a user while standing up from a seated position and sitting in vehicle seat from a standing position.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 represents a schematic representation of a swivel mechanism for swiveling the vehicle seat and showing a stationary member 31, rotating member 32 and lock bolt 32a.

DETAILED DESCRIPTION OF THE EMBODIMENTS OF THE INVENTION

Figure 1:
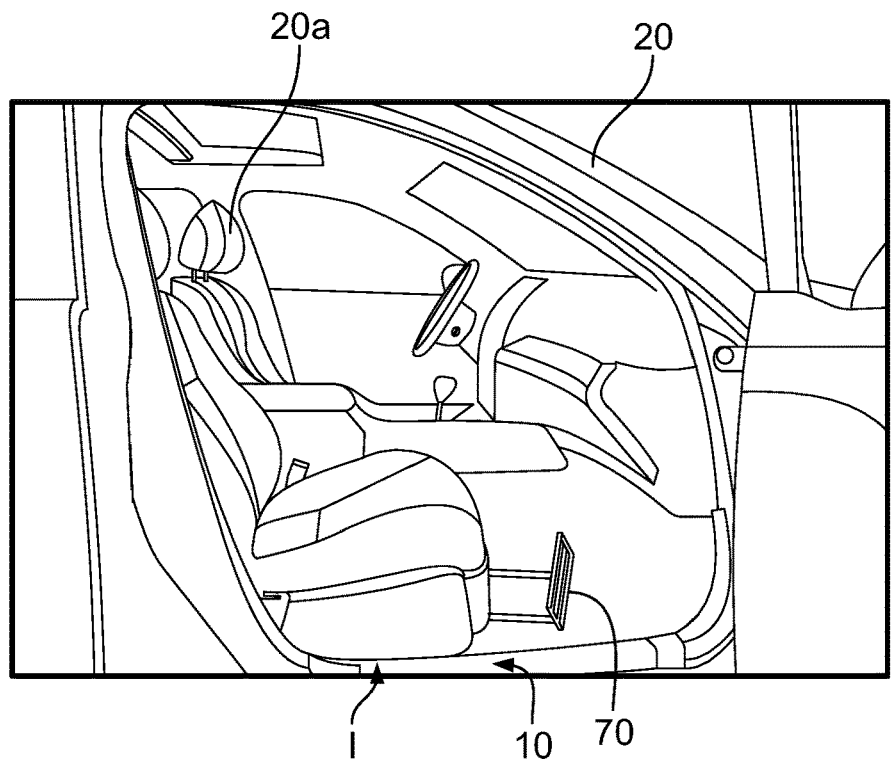
FIG. 1 represents a perspective representation of a vehicle seat in its operative environment showing vehicles seat maneuvered to a first position, in accordance with one embodiment of the present invention.

Referring now to the drawings (FIGS. 1 to 9), where the present invention is generally referred to with numeral 10, it can be observed that at least one vehicle seat 20a of a vehicle 20, in accordance with one embodiment, is maneuvered in multiple configurations by using a swivel mechanism 30, sliding mechanism 40 and tilting mechanism 50.

Figure 4:
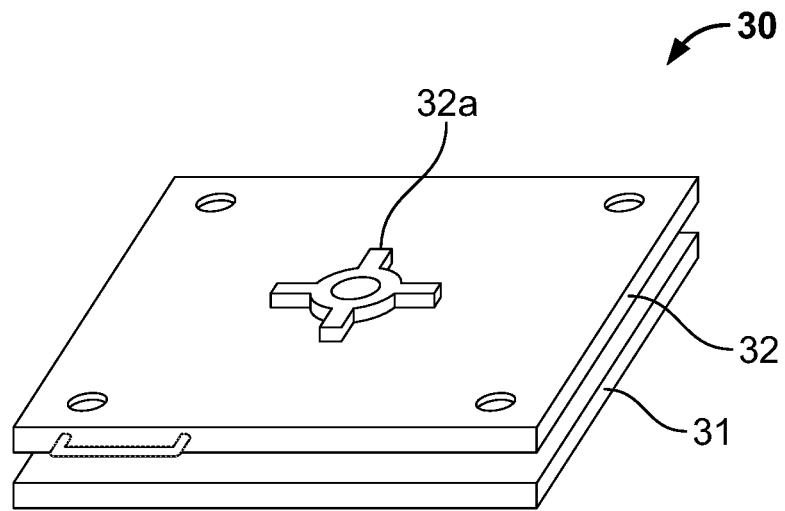
Figure 5:
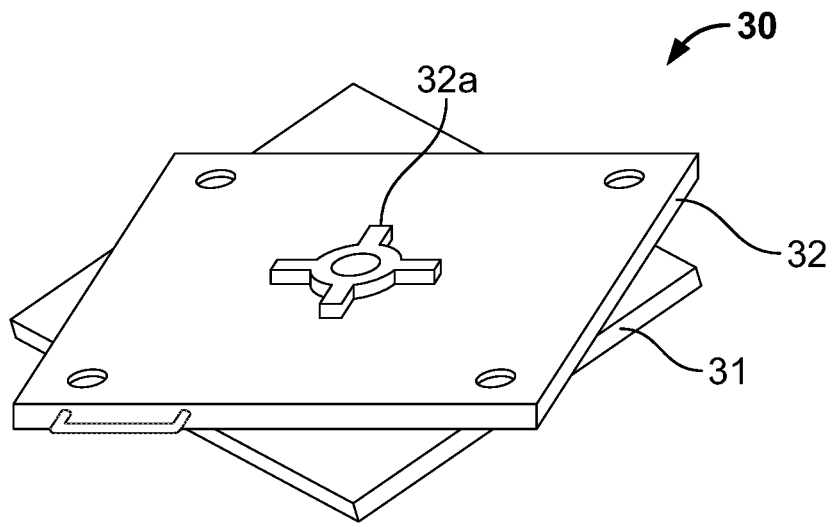
FIG. 5 represents a schematic representation of the swivel mechanism in an intermediate position such that vehicle seat is between the first position and a second position.

Swivel mechanism 30 is illustrated in FIGS. 4 and 5. Swivel mechanism 20 swivels vehicle seat 20a between a first position (I) and a second position (II) and vice-versa. In the first position (I), vehicle seat 20a is positioned in a sitting configuration in which a user 60 can be seated inside vehicle 20. In the second position (II), vehicle seat 20a is positioned in a seat maneuvering configuration in which vehicle seat 20a is positioned to slide on sliding mechanism 40.

In one embodiment, swivel mechanism 30 includes a stationary member 31, a rotating member 32 and at least one bearing (not illustrated in Figures) positioned between stationary member 31 and rotating member 32. Rotating member 32 has a lock bolt 32a for connecting rotating member 32 with vehicle seat 20a. Rotating member 32 is rotatable when a lever 23 is operated and rotating member 22 is non-rotatable/locked when lever 23 is released. Moreover, when vehicle seat 20a is in the first position (I) or second position (II) and when lever 23 is released, vehicle seat 20a is locked at respective first position (I) or second position (II). When vehicle seat 20a is in the first position (I) or second position (II) and when lever 23 is operated, the vehicle seat 20a can be swiveled from the first position (I) to second position (II) and vice-versa.

Figure 6:
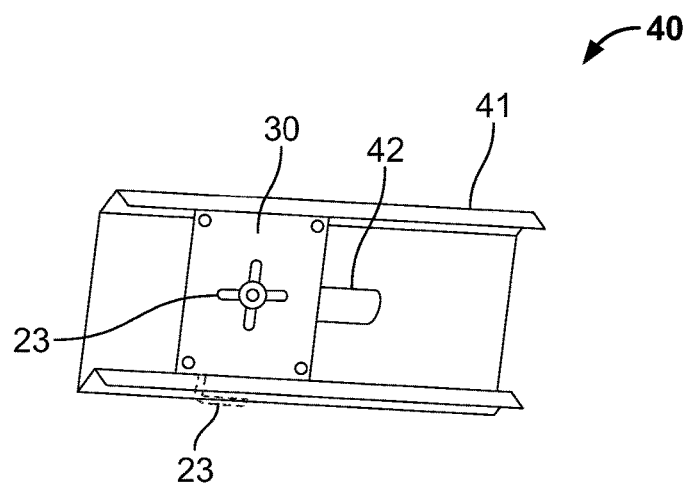
FIG. 6 represents a schematic representation of a sliding mechanism for sliding the vehicle seat and showing a telescopic track 41 operated by a hydraulic cylinder 42 and a piston 43 and sliding mechanism is in a retracted configuration.
Figure 7:
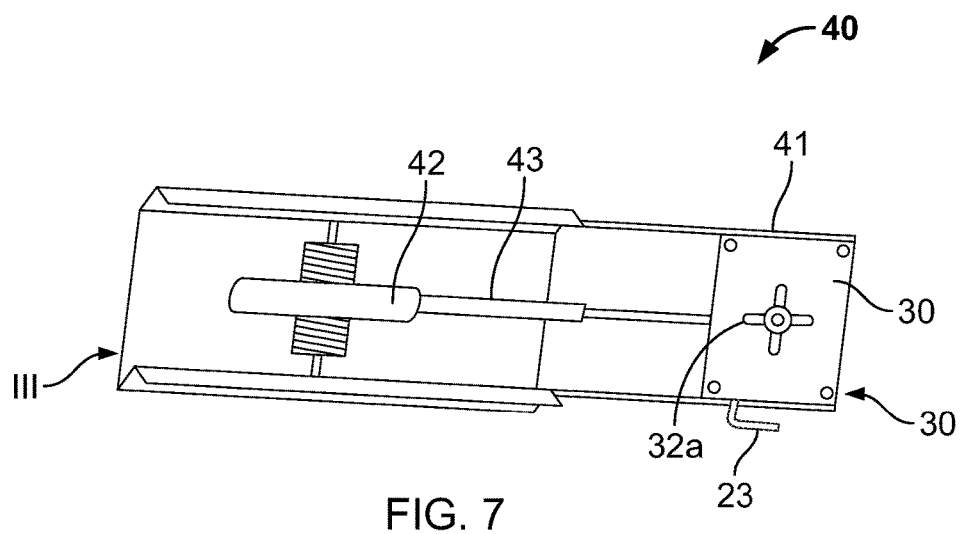
FIG. 7 represents a schematic view of the sliding mechanism in an extended configuration.

Sliding mechanism 40 is illustrated in FIGS. 6 and 7. Sliding mechanism 40 is a telescopic track 41 that moves vehicle seat 20a from interior of vehicle 20 to exterior of vehicle 20 and vice-versa. Moreover, sliding mechanism 40 moves vehicle seat 20a from the second position (II), which is in the interior of vehicle 20, to a third position (III), which is at the exterior of vehicle 20 and vice-versa. Thus, when vehicle seat 20a is moved to the third position (III) from the second position (II), user 60 seated in vehicle seat 20a is moved from the interior of vehicle 20 to the exterior of vehicle 20. Herein, the present disclosure, exterior of vehicle 20 refers to the portion outside of vehicle door 20b and interior of vehicle 20 refers to the portion inside of vehicle door 20b.

Telescopic track 41 is extended to move vehicle seat 20a in the exterior of vehicle 20 and retracted to move vehicle seat 20a in the interior of vehicle 20. Typically, telescopic track 41 is extended about one and a half feet outside vehicle door 20b. Telescopic track 41 is extended and retracted by a hydraulic mechanism that includes at least one hydraulic cylinder 42 and at least one piston 43. Piston 43 extends out and retracts within hydraulic cylinder 42 because of hydraulic force to extend and retract telescopic track 41 respectively. Though the present disclosure is described by using hydraulic mechanism for extending and retracting telescopic track 41, however, the present disclosure is not limited to use of hydraulic mechanism and other mechanisms that can extend and retract telescopic track 41 is within the scope of the disclosure.

In one embodiment, extending and retracting of telescopic track 41 is automatically actuated for extending and retracting by using lever 23 or by using another lever/actuator (not illustrated in Figures) provided in the vicinity of vehicle seat 20a. In another embodiment, along with automatic actuation, vehicle seat 20a can be manually dragged for extending and retracting so that in case of failure of the automatic operation, vehicle seat 20a can be manually maneuvered.

Figure 8:
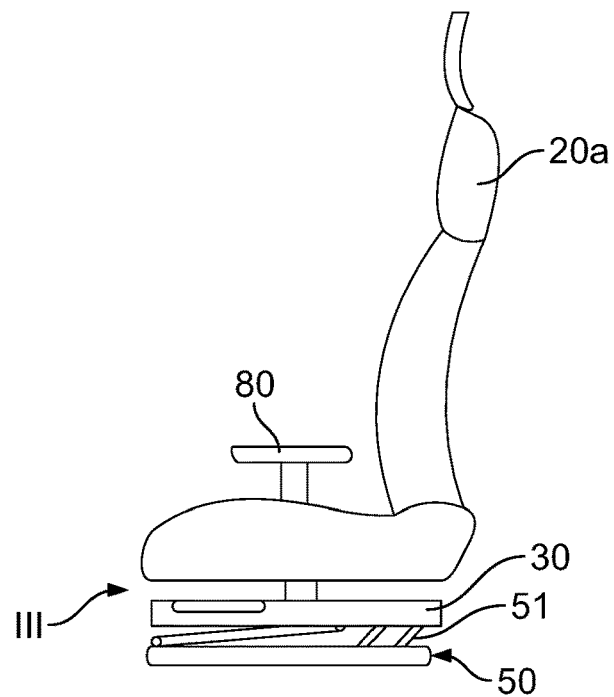
FIG. 8 represents a perspective view of a tilting mechanism for tilting the vehicle seat and showing a powered linkage 51 in a retracted configuration for achieving a non-tilted configuration of the vehicle seat.
Figure 9:
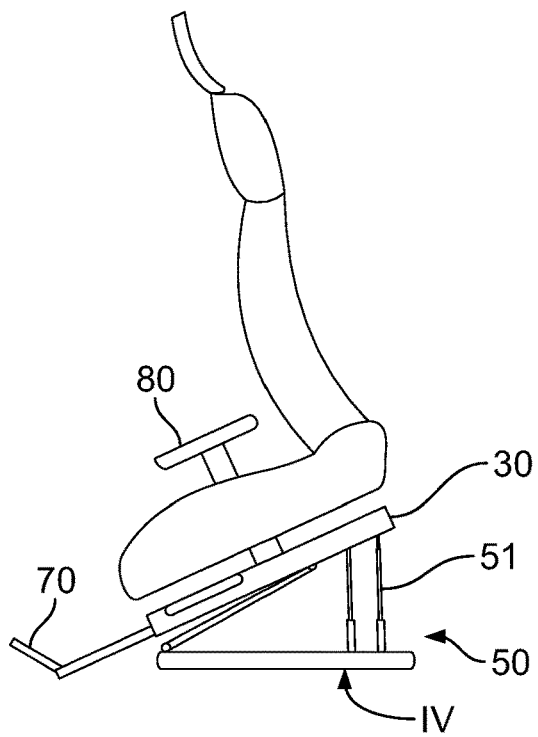
FIG. 9 represents a perspective view of the tilting mechanism in which the powered linkage 51 is in an extended configuration for achieving a tilted configuration of the vehicle seat.

Tilting mechanism 50 is illustrated in FIGS. 8 and 9. Tilting mechanism 50 is provided to tilt vehicle seat 20a between an angular range, for example, range from zero to approximately forty-five degrees, when vehicle seat 20a is positioned exterior of vehicle 20. Moreover, tilting mechanism 50 tilts vehicle seat 20a from third position (III) to a fourth position. Tilting of vehicle seat 20a facilitates user 60 to easily stand up from sitting configuration or sit/rest in vehicle seat 20 from standing configuration.

In one embodiment, tilting mechanism 50 includes one or more powered linkage(s) 51 which is/are provided under the back portion of vehicle seat 20a. Powered linkage(s) 51 when actuated, by lever 23 or by any other lever/actuator (not illustrated in Figures), lifts back portion of vehicle seat 20a up to determined height such that vehicle seat 20a is tilted to achieve determined angle and achieve the fourth position (IV). Powered linkage(s) 51 when de-actuated, by lever 23 or by any other lever/actuator, lowers back portion of vehicle seat 20a to achieve the substantially flat position of vehicle seat 20a. Powered linkage(s) 51 can be a hydraulic linkage, pneumatic linkage or mechanical linkages actuated by utilizing a power source such as battery power or solar power.

An additional retractable footrest 70 can be provided that can be extended when user 60 wish to rest their foot 60a thereon and obtain stabilization. Retractable footrest 70 can be retracted so that swiveling movement can be performed without any obstruction. In one embodiment, vehicle seat 20 can be provided with collapsible armrest 80.

In operation, when user 60, who is in exterior of vehicle 20, wish to move in the interior of vehicle 20 and get seated in vehicle seat 20a and vehicle seat 20 is the first position (I), then vehicle seat 20a is swiveled by swivel mechanism 30 from the first position (I) to the second position (II) by actuating lever 23. Once vehicle seat 20a is reached to the second position (II), telescopic track 41 of sliding mechanism 40 is extended and vehicle seat 20a slides on the extended telescopic track 41 from the second position (II) to the third position (III) and thus vehicle seat 20a is moved from interior of vehicle 20 to exterior of vehicle 20. After vehicle seat 20a reaches to the third position (III), either user 60 can directly sit in vehicle seat 20a or vehicle seat 20a can be tilted by tilting mechanism 50 to the fourth position (IV) for enabling ease for user 60 for sitting in tilted vehicle seat 20a. Once user 60 is seated, vehicle seat 20a is tilted back to the third position (III) from the fourth position (IV) (in the event if vehicle seat 20a was moved from the third position (III) to the fourth position (IV)) by tilting mechanism 50. When vehicle seat 20a is in the third position (III), vehicle seat 20a backwardly moves on telescopic track 41 of sliding mechanism 40 till vehicle seat 20a reaches the second position (II) i.e. in the interior of vehicle 20. After reaching the second position (II), vehicle seat 20a is swiveled back to the first position (I) and user 60 can comfortably sit within vehicle 20. In one embodiment, user 60 can extend retractable footrest 70 while vehicle seat 20a is in the first position (I) and/or after vehicle seat 20a is swiveled to the second position (II) and retract while swiveling from the first position (I) to the second position (II) and vice-versa.

Figure 2:
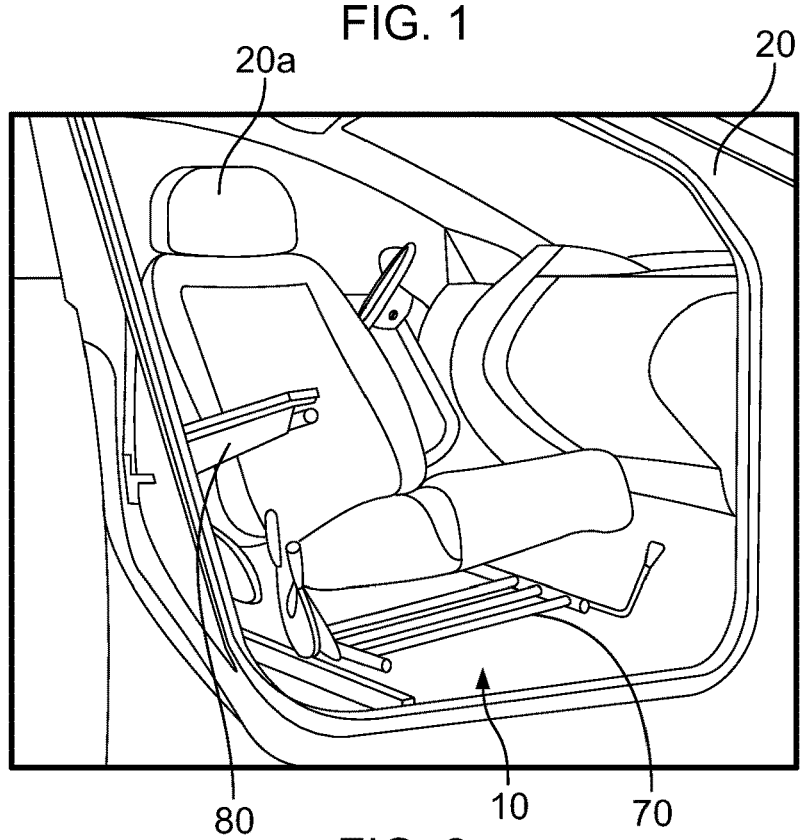
FIG. 2 represents a perspective view of the vehicle seat maneuvered by swiveling to an intermediate position.
Figure 3:
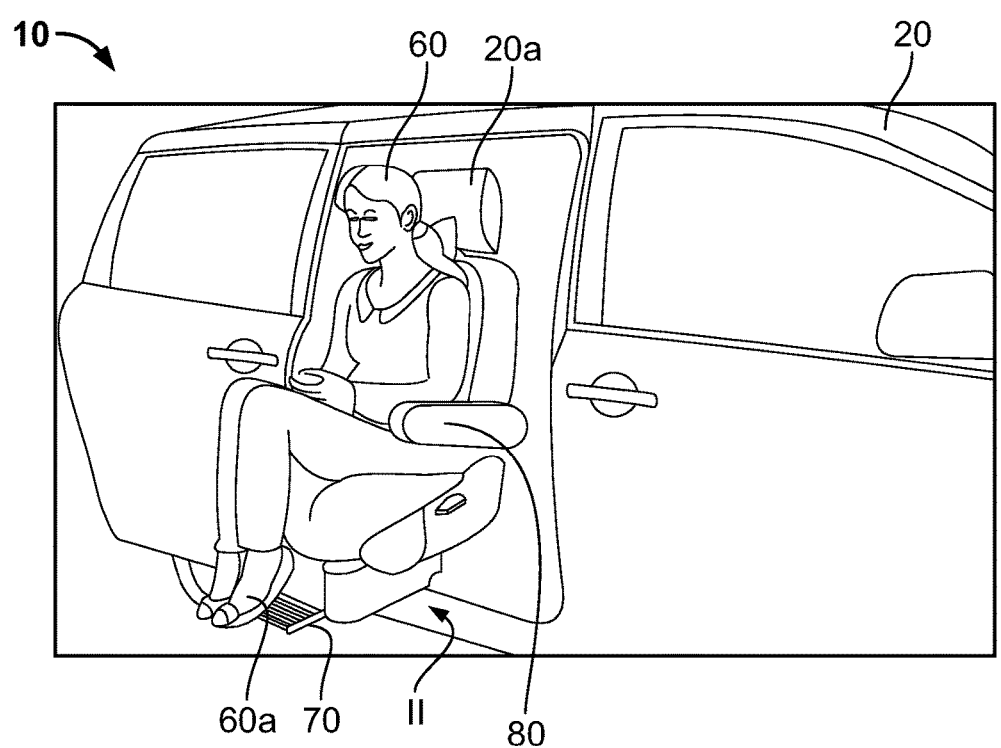
FIG. 3 represents an exemplary perspective view of the vehicle seat in operable environment sliding towards a third sitting position.

Thus, as vehicle seat 20a is easily maneuvered in multiple configurations for providing comfort by relieving some of the physical pain of dependent or disabled users 60 to move in and exit of vehicle 20. Also, as vehicle seat 20a is completely automated, dependent or disabled users 60 need not require the assistance of a caregiver and thus eliminates the stress and the strain of the caregiver. Such maneuverable vehicle seat 10 can be provided either on the front seat (as shown in FIGS. 1 and 2), rear seat or middle seat (as shown in FIG. 3) of vehicle 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A maneuverable vehicle seat, comprising:
a vehicle seat assembly mounted inside a vehicle having a swivel mechanism, a sliding mechanism, and a tilting mechanism; said swivel mechanism includes a stationary member and a rotating member having a lock bolt adapted to connect said rotating member with said vehicle seat assembly, said rotating member includes a lever member adapted to lock said vehicle seat when said lever is released; said sliding mechanism includes a telescopic track that extends said vehicle seat from the interior to the exterior of said vehicle; said tilting mechanism includes at least one powered linkage adapted to tilt said vehicle seat's backrest a predetermined angle, thereby allowing a user to easily enter and exit said vehicle.

2. The maneuverable vehicle seat of claim 1 wherein said telescopic track includes a hydraulic mechanism having at least one hydraulic cylinder and at least one piston that extends out and retracts within said hydraulic cylinder.

3. The maneuverable vehicle seat of claim 1 wherein said telescopic track is actuated using said lever or a separate lever mounted to said telescopic track.

4. The maneuverable vehicle seat of claim 1 wherein said vehicle seat assembly includes a retractable footrest.

5. The maneuverable vehicle seat of claim 1 wherein said vehicle seat assembly includes a collapsible armrest.

6. The maneuverable vehicle seat of claim 1 wherein said tilting mechanism tilts said vehicle seat between zero and forty-five degrees.

7. The maneuverable vehicle seat of claim 1 wherein said telescopic track is extended one and a half feet outside said vehicle.

* * * * *